(12) United States Patent
Liu

(10) Patent No.: US 9,575,910 B2
(45) Date of Patent: Feb. 21, 2017

(54) USB RAM DEVICE WITH BUFFER DESCRIPTOR TABLE AND DYNAMICALLY CONFIGURABLE ENDPOINT ALLOCATION

(71) Applicant: Bingkun Liu, Suzhou (CN)

(72) Inventor: Bingkun Liu, Suzhou (CN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 342 days.

(21) Appl. No.: 14/556,214

(22) Filed: Nov. 30, 2014

(65) Prior Publication Data

US 2016/0048467 A1 Feb. 18, 2016

(30) Foreign Application Priority Data

Aug. 14, 2014 (CN) .......................... 2014 1 0562205

(51) Int. Cl.
*G06F 13/00* (2006.01)
*G06F 13/16* (2006.01)
*G06F 13/28* (2006.01)

(52) U.S. Cl.
CPC ........... *G06F 13/1673* (2013.01); *G06F 13/28* (2013.01)

(58) Field of Classification Search
CPC ............................. G06F 13/1673; G06F 13/28
See application file for complete search history.

(56) References Cited

U.S. PATENT DOCUMENTS

| 5,974,486 A | 10/1999 | Siddappa |
| 6,173,355 B1 | 1/2001 | Falik et al. |
| 6,185,641 B1 | 2/2001 | Dunnihoo |
| 6,219,736 B1 * | 4/2001 | Klingman ........... G06F 13/4295 370/259 |
| 7,069,373 B2 | 6/2006 | Teng |
| 8,560,753 B1 * | 10/2013 | Hobbs .................. G06F 3/1454 345/2.1 |
| 2006/0224812 A1 * | 10/2006 | Kapoor ............... G06F 13/4022 710/310 |

* cited by examiner

*Primary Examiner* — Tammara Peyton
(74) *Attorney, Agent, or Firm* — Charles E. Bergere

(57) ABSTRACT

A compound USB device has a controller and a N+1 component USB devices. Each component USB device $C_i$ is assigned $E_i$ endpoints, where $0 \leq i \leq N$ and where each component USB device is assigned at least as many endpoints as required by its functionality. At least one component USB device is assigned the maximum number endpoints. At least one other component USB device is assigned the minimum number of endpoints, which is less than the maximum. The controller includes a RAM-share subsystem with a RAM module. The RAM module includes a USB RAM segment that has a buffer descriptor (BD) table and an endpoint data buffer. The BD table includes a corresponding entry for each assigned endpoint. At least a portion of the USB RAM segment is assigned for non-USB uses.

16 Claims, 3 Drawing Sheets

USB RAM DEVICE WITH BUFFER
DESCRIPTOR TABLE AND DYNAMICALLY
CONFIGURABLE ENDPOINT ALLOCATION

BACKGROUND OF THE INVENTION

The present invention relates to Universal Serial Bus (USB) devices, and, more particularly, to memory allocation in USB controllers.

A USB peripheral device is a peripheral device such as a mouse, keyboard, joystick, camera, scanner, printer, or data-storage device, that connects to a host computer via a USB connection (e.g., a USB cable) and in accordance with a USB Specification. The USB Specification provides technical details specifying the behavior and interactions of USB devices and hosts. The current revision is USB Specification 3.1, which is available online at http://www.usb.org/.

A host computer that is capable of interacting with a USB peripheral device includes at least one USB port and a host controller. A host's USB port can connect to a USB peripheral device or a USB hub.

Note that, as used herein, (i) "USB peripheral device" refers to a tangible and individually connectable USB device, while (ii) "USB device" refers to a USB device in any one of a variety of formats, including, for example, (a) a USB peripheral device, (b) a logical USB device that is not individually connectable but is individually addressable by the host controller, or (c) one of the varieties of USB devices described below.

A USB device typically includes at least one host-accessible function, such as, for example, human-interfacing, printing, scanning, or data storage. A USB hub connects to a host USB port upstream and multiple USB devices downstream, thereby expanding the number of USB devices that can connect to the host USB port.

A compound USB device is a type of USB device that internally incorporates a USB hub and one or more connected USB devices. As a result, to the host controller, the compound USB device appears as a hub with one or more permanently connected USB devices. A composite USB device, meanwhile, is a USB device that incorporates a plurality of host-accessible functions, but does not include a hub and has only one USB-device address. Note that a compound USB device may include, along with the incorporated hub, uniquely addressable single-function, composite, and/or compound devices.

Communication between a host and a USB device is performed through logical channels called pipes that are established between the host and logical endpoints in the USB device. A particular endpoint is identified by its USB device enumerator, endpoint enumerator, and endpoint direction. An endpoint's direction may be IN or OUT, where (i) an IN endpoint provides data in to the host, while (ii) an OUT endpoint receives data out from the host. An example of an endpoint identifier is "device 0 endpoint 0 IN."

There are generally two kind of pipes: message and stream. Message pipes are used for control functions and use an IN/OUT pair of endpoints, typically endpoint 0 IN and endpoint 0 OUT. Stream pipes are used for data transfers to and/or from the USB device.

A USB device may support a plurality of pipelines. A conventional USB device may have up to 16 IN endpoints and 16 OUT endpoints for a total of 32 endpoints. The actual number of endpoints allocated depends on the particular hardware implementation. Different USB devices require a different number of endpoints.

All of the component USB devices in a conventional compound USB device are assigned at least the maximum number of endpoints that any component device requires. In other words, if a compound USB device comprises eight component USB devices and the maximum number of endpoints needed by any one of the eight component USB devices is eight, then, each of the eight component USB devices would be assigned eight endpoints. This allocation method is simple to implement and use.

FIG. 1 is a simplified schematic block diagram of an exemplary conventional compound USB microcontroller unit (MCU) 100 that is connected to a host computer (not shown). The USB MCU 100 comprises random-access memory (RAM) share subsystem 101 and eight USB devices 102, such as, for example, USB Device 102(0). The RAM share subsystem 101 comprises a Serial Interface (SI) engine 103, RAM module 104, and USB MCU core 105, which are modules involved in managing endpoints for the component USB devices 102. Each of the USB devices 102 is communicatively connected to the SI engine 103 of the RAM share subsystem 101. The SI engine 103 is connected to the RAM module 104, which, in turn, is connected to the USB MCU core 105.

The SI engine 103 is used in controlling the transfer of data between the USB devices 102 and a host. The USB MCU core 105 performs conventional processor control functions for the USB MCU core 105. In other words, the USB MCU core 105 is a processor core. The RAM module 104 provides random access memory for use by various modules of the USB MCU 100 in their assorted operations.

FIG. 2 is a schematic diagram of the RAM module 104 of FIG. 1. The RAM module 104 includes (a) USB RAM 201, which is a RAM segment dedicated for USB functions, such as endpoint management and USB data buffering, and (b) general purpose RAM 202. The USB RAM 201 has a capacity of 2,000 bytes. The USB RAM 201 comprises a buffer descriptor (BD) table 203 and an endpoint data buffer 204.

The BD table 203 comprises buffer descriptors organized in logical rows. Each buffer descriptor includes status and control information for its corresponding endpoint buffer. Buffer descriptors are identified by the identifier of the corresponding endpoint—in other words, by device enumerator, endpoint enumerator, and direction.

The maximum number of endpoints used by any one of the exemplary USB devices 102(0)-102(7) is eight. Consequently, each USB device 102 is allocated eight endpoints and the BD table 203 comprises 64 rows. If each buffer descriptor uses four bytes of data, then the BD table 203 is 256 bytes (=8*8*4), leaving 1,744 bytes for the endpoint data buffer 204 (=2,000 −256). If the maximum number of endpoints were 16 instead of 8, then the BD table would need to be 512 bytes (=16*8*4), which might require allocation of more than 2,000 bytes to the USB RAM 201, which would take up a larger portion of the RAM module 104, or would require replacing the RAM module 104 with a larger memory module.

Alternative methods of allocating endpoints and/or buffer descriptors may be useful.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements. Note that elements in the figures are not drawn to scale.

DETAILED DESCRIPTION

Detailed illustrative embodiments of the present invention are disclosed herein. However, specific structural and functional details disclosed herein are merely representative for purposes of describing example embodiments of the present invention. Embodiments of the present invention may be embodied in many alternative forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "has," "having," "includes," and/or "including" specify the presence of stated features, steps, or components, but do not preclude the presence or addition of one or more other features, steps, or components. It also should be noted that, in some alternative implementations, the functions/acts noted may occur out of the order noted in the figures.

In one embodiment of a novel compound USB device controller, endpoints are allocated to the component USB devices of the compound USB device depending on the particular needs of the particular component USB devices. As a result, if one component device needs only two endpoints, then it will be allocated two endpoints, regardless of how many endpoints other component devices of the compound USB device require.

Figure 1:
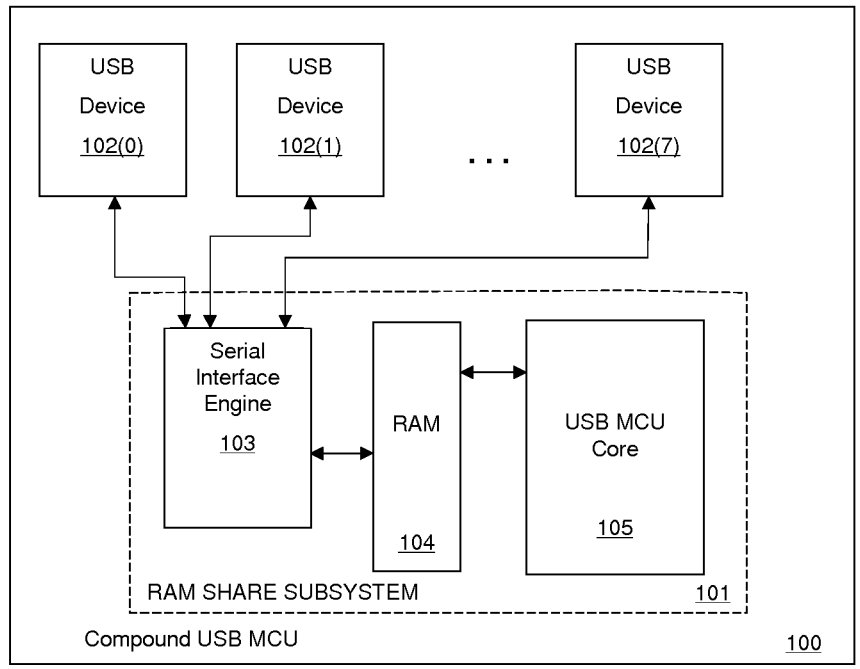
FIG. 1 is a simplified schematic block diagram of an exemplary conventional compound USB microcontroller unit (MCU)
Figure 3:
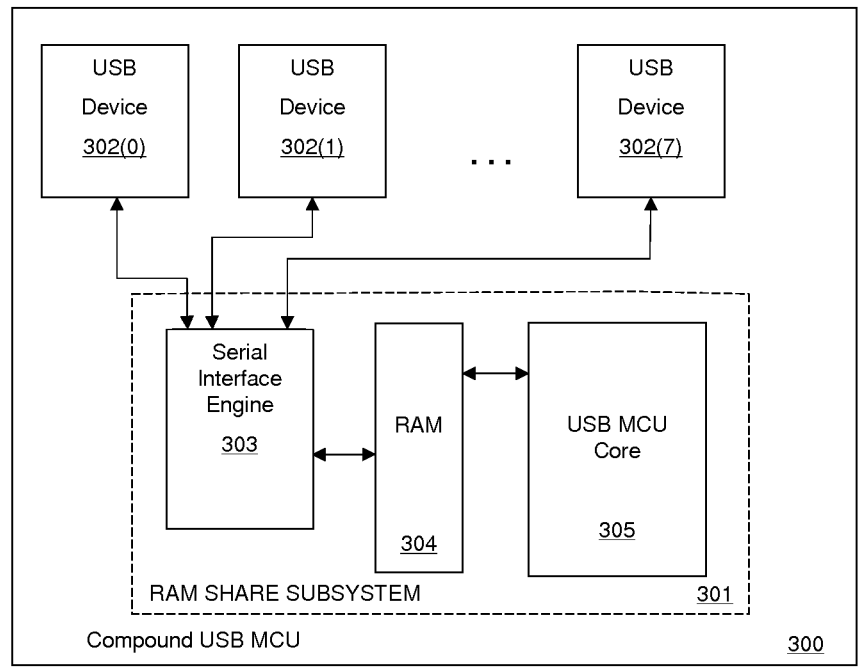
FIG. 3 is a simplified schematic block diagram of an exemplary compound USB MCU in accordance with one embodiment of the invention.

FIG. 3 shows a simplified schematic diagram of an exemplary compound USB MCU 300 in accordance with one embodiment of the invention. Elements of FIG. 3 that are substantially similar to corresponding elements of FIG. 1 are similarly labeled but with a different prefix.

Compound USB MCU 300 comprises eight component USB devices 302, labeled USB device 302(0)-(7), each of which is communicatively connected to SI engine 303. One or more of USB devices 302 may be a predefined-class device such as, for example, a human interface device (HID), a mass storage device (HSD), a communication device class (CDC), an audio device, and a video device. As would be appreciated by a person of ordinary skill in the art, different devices require different types and numbers of endpoints. Compound USB MCU 300 comprises a USB hub (not shown), which may be a logically implemented hub or a hardware-implemented hub and which connects to the component USB devices 302.

Figure 2:
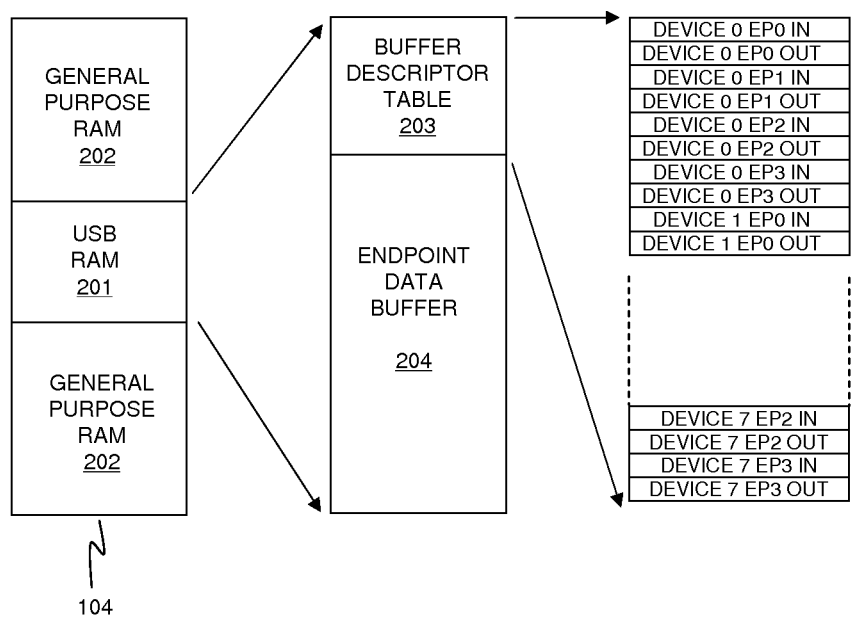
FIG. 2 is a schematic diagram of a RAM module of the USB MCU of FIG. 1.
Figure 4:
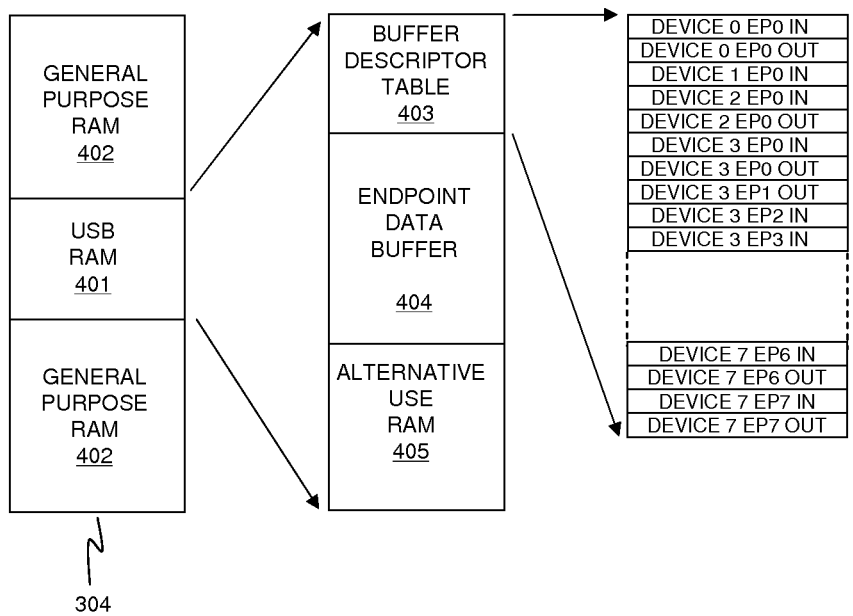
FIG. 4 is a schematic block diagram of a RAM of the USB MCU of FIG. 3.

FIG. 4 shows a schematic diagram of the RAM 304 of FIG. 3. Elements of FIG. 4 that are substantially similar to corresponding elements of FIG. 2 are similarly labeled but with a different prefix. The RAM 304 includes (i) USB RAM 401, which, in turn, comprises BD table 403 and endpoint data buffers 404 and (ii) general-purpose RAM 402. Each buffer descriptor of BD table 403 includes status and control information for its corresponding endpoint buffer—such as, for example, buffer size—as well as a pointer to a corresponding data buffer in endpoint data buffer 404. The pointer is the address of the corresponding data buffer.

Component USB device 302(1) requires only one endpoint and, consequently, it is assigned only one endpoint—identified as "device 1 EP0 IN"—and gets only one entry in the BD table 403 and, correspondingly, only one buffer in the data buffer 404. Meanwhile, USB device 302(7) requires 16 endpoints and, consequently, is assigned 16 endpoints, gets 16 entries in the BD table, and 16 corresponding buffers in the data buffer 404. The other USB devices 302 require anywhere from 1 to 16 endpoints and have a corresponding number of BD table entries and buffers.

Note that both compound USB MCU 100 of FIG. 1 and compound USB MCU 300 of FIG. 3 have eight equivalent component USB devices. The reduced number of (i) BD table entries in BD table 403—compared to the number of entries in conventional BD table 203 of FIG. 2—and (ii) data buffers in data buffer 404—compared to the number of data buffers in conventional data buffer 204—allows for more efficient use of RAM 304 compared to RAM MODULE 104.

In general, for compound USB devices having N+1 component USB devices, where (i) $E_i$ is the number of endpoints needed by component USB device $C_i$ and (ii) i is an integer counter going from 0 to N, the total $T_{100}$ number of endpoints assigned in conventional USB MCU 100 of FIG. 1 is $$T_{100} = \sum_{i=0}^{N} \max(E_i \mid i = 0 \ldots N) = (N+1) * \max(E_i) \quad \text{(Equation 1)}$$

while the total number $T_{CA}$ of endpoints assigned in USB MCU 300 is $$T_{CA} = \sum_{i=0}^{N} E_i. \quad \text{(Equation 2)}$$

Unless every component device $C_i$ needs the same number of endpoints, $T_{CA}$ is less than $T_{100}$.

The reduced buffer descriptor and data buffer requirements may be used to allocate a portion 405 of USB RAM 401 to alternative uses—in other words, alternative use RAM 405 may be used by RAM share subsystem 301—for example, by USB MCU core 305—as general purpose RAM. In some implementations, the allocated size of USB RAM 401 may simply be reduced, thereby increasing the size of general purpose RAM 402 without designating an alternative-use RAM 405.

Figure 5:
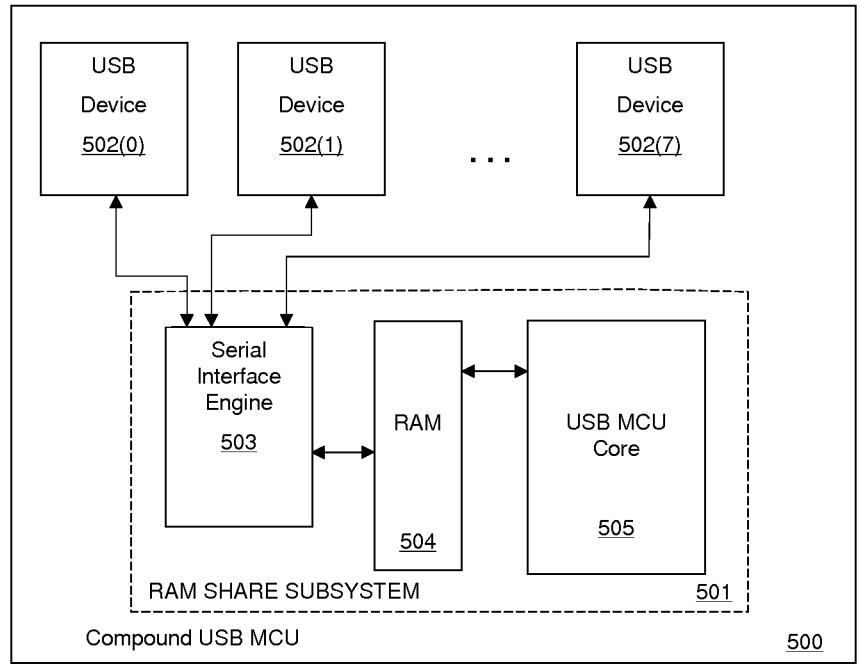
FIG. 5 is a simplified schematic diagram of an exemplary compound USB MCU in accordance with another embodiment of the invention.

FIG. 5 shows a simplified schematic diagram of an exemplary compound USB MCU 500 in accordance with another embodiment of the invention. Elements of FIG. 5 that are substantially similar to corresponding elements of FIG. 3 are similarly labeled but with a different prefix.

Figure 6:
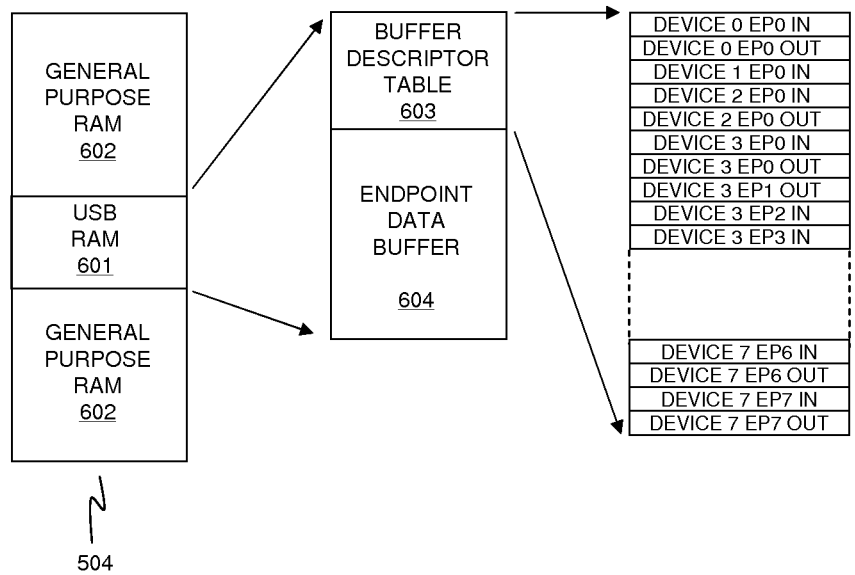
FIG. 6 is a schematic block diagram of an exemplary RAM of FIG. 5.

FIG. 6 shows a schematic diagram of the exemplary RAM 504 of FIG. 5. Elements of FIG. 6 that are substantially similar to corresponding elements of FIG. 4 are similarly labeled but with a different prefix. Note that USB RAM 504 does not include an alternative-use RAM segment like the alternative-use RAM 405 of USB RAM 401 FIG. 4. The more-efficient use of RAM 504 compared to RAM MODULE 104 allows for a reduction in size of RAM 504—where compound USB MCU 100 of FIG. 1 and compound USB MCU 500 of FIG. 5 both include eight equivalent component USB devices. The reduced relative size of RAM module 504 compared to RAM module 104 allows for reducing the relative production cost of the compound USB MCU 500 compared to compound USB MCU 100.

Exemplary compound USB MCUs 300 and 500 may be used as templates for designing similar compound USB MCUs with minimal changes while allowing the designer flexibility to reconfigure endpoint assignments as necessitated or suggested by modifications to the numbers and/or types of component USB devices.

Exemplary embodiments of the invention have been described with particular sizes of memory modules and segments. The invention is not so limited. As would be appreciated by a person of ordinary skill in the art, different implementations may have memory modules, segments, buffers, registers, etc., of sizes different from those described above.

Embodiments of the invention have been described where each component USB device of a compound USB device is assigned only the number of endpoints that it requires. In one alternative embodiment, each component USB device is assigned at least the number of endpoints that it requires, where at least one component USB device is assigned less than the maximum number of endpoints assigned to any component USB device of the compound USB device. In other words, for at least one component USB device of an (N+1)-device compound USB device, where i goes from 0 to N, $E_i < \max(E_i)$.

Embodiments of the invention have been described where pointers to buffers are the addresses of the buffers. It should be noted that, in alternative implementations, an alternative pointer may be used to indicate and/or access a corresponding buffer.

Embodiments of the invention have been described with particular direct interconnects between particular controller components. The invention is not so limited. In alternative embodiments, two or more of the components are communicatively connected to a common communication bus that is shared among the two or more components using any available bus-sharing scheme.

Embodiments of the invention have been described where each component USB device of a compound USB device uses at least one endpoint. The invention is not so limited. In some alternative embodiments, one or more of the component USB devices do not use any endpoints and, as a result, are not assigned any endpoints and have no corresponding entries in the buffer descriptor table and no buffers in the endpoint data buffer.

Embodiments of the invention have been described where every entry in the BD table includes a pointer to a corresponding endpoint data buffer. In some implementations, one or more endpoints do not require the use of a buffer, and their corresponding entries in the BD table do not point at a usable data buffer. Any one of these BD table entries may have a null pointer, may have an address of a non-existent buffer, or may have the address of an unused buffer that may be shared with other similar endpoints.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

The invention claimed is:

1. A compound universal serial bus (USB) microcontroller comprising:
  a random-access memory (RAM) share subsystem comprising:
    a serial interface engine;
    a RAM module including a USB RAM comprising (i) a buffer descriptor (BD) table and (ii) an endpoint data buffer; and
    a processor core;
  a plurality of component USB devices, wherein:
    each component USB device is assigned a corresponding set of endpoints;

the BD table comprises a plurality of entries corresponding to the endpoints assigned to the component USB devices, each entry including status and control information for the corresponding endpoint;

a first component USB device is assigned a maximum number of endpoints; and a second component USB device is assigned a minimum number of endpoints that is less than the maximum number of endpoints.

2. The device of claim 1, wherein:

the number of component USB devices is N+1;

N is a positive integer;

i is a counter from 0 to N;

the number of endpoints that each component USB device $C_i$ is assigned is $E_i$;

$\max(E_i)$ is the maximum value of $E_i$ for i=0 ... N;

$\min(E_i)$ is the minimum value of $E_i$ for i=0 ... N;

for at least one $C_i$, $E_i < \max(E_i)$; and for at least one $C_i$, $E_i > \min(E_i)$.

3. The device of claim 2, wherein $\min(E_i)=0$.

4. The device of claim 2, wherein $\max(E_i)$ is 16.

5. The device of claim 4, wherein $\min(E_i) \leq 2$.

6. The device of claim 1, wherein each component USB device is assigned only the number of endpoints required by the respective component USB device.

7. The device of claim 1, comprising a hub for connecting the component USB devices to a host computer.

8. The device of claim 1, wherein the RAM module further comprises a general-purpose RAM segment for use by the processor core.

9. The device of claim 1, wherein the USB RAM comprises an alternate-use RAM segment for use by the processor core.

10. The device of claim 1, wherein one or more of the entries in the BD table includes a pointer to a respective corresponding data buffer in the endpoint data buffer.

11. The device of claim 10, wherein each of the entries in the BD table includes a pointer to the respective corresponding data buffer in the endpoint data buffer.

12. The device of claim 10, wherein at least one of the entries in the BD table does not have a corresponding data buffer in the endpoint data buffer.

13. The device of claim 12, wherein each of the at least one of the entries in the BD table without a corresponding data buffer does not include a pointer to any data buffer in the endpoint data buffer.

14. The device of claim 1, wherein the BD table is sized to accommodate precisely the total number of endpoints assigned to the component USB devices.

15. The device of claim 1, wherein the RAM module is sized to accommodate precisely the BD table and the endpoint data buffer.

16. The device of claim 1, wherein:

the RAM module further comprises a general-purpose RAM segment for use by the processor core; and the RAM module is sized to accommodate precisely the BD table, the endpoint data buffer, and the general-purpose RAM.

\* \* \* \* \*